Patented Mar. 29, 1949

2,465,865

UNITED STATES PATENT OFFICE 2,465,865

2-(p-METHOXYBENZYL, DIMETHYLAMINO-ETHYL) AMINOPYRIMIDINE AND ITS HYDROCHLORIDE

Harris L. Friedman, New York, and Alexander V. Tolstoouhov, Bronx, N. Y., assignors to Pyridium Corporation, Yonkers, N. Y., a corporation of New York No Drawing. Application June 26, 1946, Serial No. 679,578

1 Claim. (Cl. 260—251)

Our invention relates to compounds useful as therapeutic preparations, and is more particularly directed to a class of compounds having antihistamine action and to the processes for their manufacture.

There are a number of compounds having antihistamine action, most of which are of similar structure, namely, an aromatic ring with a side chain consisting of an aliphatic amine.

We have now found that certain 2-aminopyrimidine derivatives also have antihistamine action, this activity having been demonstrated on experimental animals.

One object of our invention is to provide new compounds which are useful therapeutically in counteracting the effects due to the liberation of histamine in the tissues.

Another object of our invention is to provide compounds, which are relatively non-toxic, and cause comparatively slight by-effects when used in therapeutic doses.

Other objects of our invention will be evident from a consideration of our specification.

The compounds of our invention are derivatives of 2-aminopyrimidines, in which both hydrogen atoms of the amino group are substituted.

The general formula of our compounds is as follows:

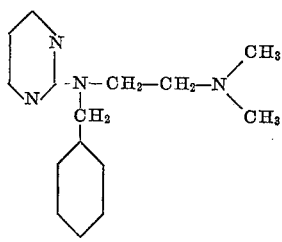

One or more of the hydrogen atoms in the pyrimidine ring, or in the benzene ring, or both, may be substituted with lower alkyl radicals, lower alkoxy radicals or nitro groups.

Under lower alkyl radicals in our specification is meant, unsubstituted alkyl radicals, such as methyl-, to hexyl- radicals, these alkyl radicals being selected from a group of monovalent radicals derived from a saturated hydrocarbon, and may be normal or isomeric alkyl radicals, and they contain not more than six carbon atoms. Those with one or two carbon atoms appear to be the most effective.

In carrying out our invention, we use as starting materials 2-aminopyrimidines, in which one of the hydrogen atoms of the amino group is substituted. This substituent may be a member of the arylalkyl group, or it may be a dialkylaminoalkyl group. Our starting material which is a 2-(secondary amino) pyrimidine, is treated with sodium amide forming the sodium salt and ammonia being liberated, according to the following equation:

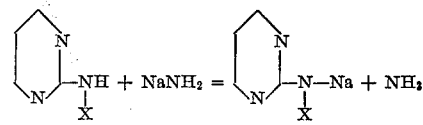

This sodium salt is very reactive and forms the final product as follows:

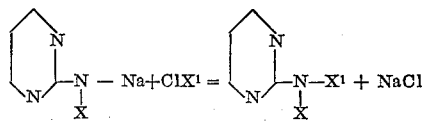

X in these equations represents the arylalkyl or the dialkylaminoalkyl group on the starting material, and $X^1$ represents the dialkylaminoalkyl or arylalkyl group, to be substituted in place of the hydrogen of the NH group of the starting material.

The following are several illustrative examples of some of the preferred procedures of carrying out the present invention, which are given for illustration and not for limitation.

The 2-aralkylamino pyrimidines used in the examples were prepared according to the procedure described in our copending application, Serial Number 660,428 filed April 8, 1946.

Example I

Twenty-seven and seven tenths grams of 2-benzylaminopyrimidine and 8.8 grams of sodamide were suspended in 100.0 cc. of toluene and were refluxed until the ammonia development ceased. To the thus prepared sodium salt suspension of 2-benzylaminopyrimidine compound thus formed, 15.0 grams of dimethylaminoethylchloride were added and refluxed under continuous stirring for 54 hours. After cooling, the reaction mixture was extracted with dilute hydrochloric acid at about pH 5.0, removing the product thus formed containing only very little of the unreacted 2-benzylaminopyrimidine. This solution was then made alkaline to liberate the free base of the product, which was extracted with ether. The ether solution was evaporated and the residue vacuum distilled. The product 2-(benzyl, dimethylaminoethyl) - aminopyrimidine forms a yellow oil, boiling point 148–155° C. at 3 mm.

Example II

Seventeen and five tenths grams of 2-benzylamino, -4 methylpyrimidine, and 3.12 grams of sodamide were suspended in 100 cc. of toluene and refluxed for 48 hours. Then 11 grams of dimethylaminoethylchloride were added and refluxed for an additional 16 hours, and worked up as in Example I. The product, 2-(benzyl, dimethylaminoethyl)-amino, 4 - methylpyrimidine forms an oily liquid, boiling point 138° C. at 1.4 mm.

Example III

One hundred and six and seven tenths grams of 2-benzylamino, 4,6-dimethylpyrimidine and 19.5 grams of sodamide were suspended in 200 cc. of toluene and were refluxed until the ammonia development ceased. To the thus prepared suspension of 2-benzylamino, 4,6-dimethylpyrimidine, 53.5 grams of dimethylaminoethylchloride were added, refluxed for 24 hours and worked up as in Example I. The product, 2-(benzyl, dimethylaminoethyl)-amino, 4,6-dimethylpyrimidine forms a yellow oil, boiling point 117° C. at 1.7 mm.

Example IV

Fifty-four grams of 2-(p-methoxybenzyl) aminopyrimidine and 12.0 grams of sodamide were suspended in 250 cc. of toluene and were refluxed for 31 hours. To the thus prepared sodium salt of 2-(p-methoxybenzyl) aminopyrimidine, 28.1 grams of dimethylaminoethylchloride were added and refluxed under continuous stirring for 26 hours, and worked up as in Example I. The product 2-(p-methoxybenzyl, dimethylaminoethyl) aminopyrimidine forms an oily liquid, boiling point 185–187° C. at 2.2 mm.

The products formed in the foregoing examples are of similar character. The free base is an oily liquid which can be distilled under high vacuum without decomposition. With acids they form addition salts which may be recrystallized for further purification. For therapeutic use we prefer the hydrochloride which is made in the following way.

Example V

To 1000 grams of 2-(benzyl, dimethylaminoethyl) aminopyrimidine, 406 grams of concentrated (36%) hydrochloric acid and 2250 cc. acetone were added. The solution was well cooled, and the separated crystalline hydrochloride of the compound was collected on a filter and washed with acetone. The filtrate was made alkaline, the free base extracted with ether, and the procedure as described above repeated. The product 2-(benzyl, dimethylaminoethyl) aminopyrimidine hydrochloride forms white cubic crystals, and its melting point is 211–212° C.

By changing the substituents on the aminopyrimidine and on the benzene ring different embodiments of our invention may be made without departing from the spirit thereof.

We do not limit ourselves to the specifically mentioned times, temperatures, quantities, chemicals or steps of procedure as these are given simply to clearly describe our invention as set forth in our specification and claim, and they may be varied without going beyond the scope of our invention.

What we claim is:

2 - (p - methoxybenzyl, dimethylaminoethyl) aminopyrimidine and its hydrochloride.

HARRIS L. FRIEDMAN.
ALEXANDER V. TOLSTOOUHOV.

REFERENCES CITED

The following references are of record in the file of this patent:

UNITED STATES PATENTS

| Number | Name | Date |
|---|---|---|
| 2,406,594 | Djerassi et al. | Aug. 27, 1946 |

OTHER REFERENCES

J. Am. Chem. Soc. 67, 735–738 (1945).